United States Patent [19]

Bergmann

[11] Patent Number: 5,672,957

[45] Date of Patent: Sep. 30, 1997

[54] METHOD AND DEVICE FOR REDUCING VOLTAGE IMBALANCES IN A THREE-PHASE NETWORK BY MEANS OF A STATIC COMPENSATOR

[75] Inventor: Klaus Bergmann, Stegaurach/Bundesrepublik, Germany

[73] Assignee: Siemens Aktiengesellschaft, Munich, Germany

[21] Appl. No.: 557,076

[22] PCT Filed: Jun. 3, 1993

[86] PCT No.: PCT/DE93/00478

§ 371 Date: Dec. 4, 1995

§ 102(e) Date: Dec. 4, 1995

[87] PCT Pub. No.: WO94/29939

PCT Pub. Date: Dec. 22, 1994

[51] Int. Cl.[6] ............................................. G05F 1/70
[52] U.S. Cl. ........................... 323/210; 323/213; 323/211
[58] Field of Search ................................ 323/210, 211, 323/213, 218

[56] References Cited

U.S. PATENT DOCUMENTS

| | | | |
|---|---|---|---|
| 4,156,176 | 5/1979 | Gyugyi et al. | 323/106 |
| 4,234,842 | 11/1980 | Brennen et al. | 323/219 |
| 4,356,441 | 10/1982 | Putman et al. | 323/210 |
| 4,719,402 | 1/1988 | Brennen et al. | 323/211 |
| 5,091,839 | 2/1992 | Gaul et al. | 363/41 |

FOREIGN PATENT DOCUMENTS

| | | |
|---|---|---|
| 31 05 042 | 8/1982 | Germany . |
| 39 27 437 | 4/1991 | Germany . |

OTHER PUBLICATIONS

Energy & Automation X (1989), No. 1, Gerhard Thumm et al.; *A Closer Look at Thyristors in SVC Applications*, pp. 12–17.

Cigre Conference (International Conference on Large High Voltage electric Systems), Paris, FR, 28 Sep. – 3 Sep. 1988, pp. 1–6, B. Klerfors et at.: *Balancing Asymmetries by Means of Thyristor–Controlled Status VAR Compensators*.

IEE Fifth International Conference on AC and DC Power Transmission, 1991, pp. 255–260, C. Welsh: *System Variable Evaluation with Digital Signal Processors for SVC Applications*.

Primary Examiner—Peter S. Wong
Assistant Examiner—Shawn Riley
Attorney, Agent, or Firm—Kenyon & Kenyon

[57] ABSTRACT

The invention relates to a method and a device for reducing imbalances ($\Delta V_{12}$, $\Delta V_{23}$, $\Delta V_{31}$) in a three-phase network (42) by means of a static compensator. According to the invention, a correction signal ($\Delta B_{12}$, $\Delta B_{23}$, $\Delta B_{31}$) is in each case superimposed on a mean susceptance value ($B_{SVC}$), which is produced, of the static compensator, which correction signals ($\Delta B_{12}$, $\Delta B_{23}$, $\Delta B_{31}$) are in each case proportional to an imbalance ($\Delta V_{12}$, $\Delta V_{23}$, $\Delta V_{31}$), which imbalances are determined from measured line to earth voltages ($V_{01}$, $V_{02}$, $V_{03}$) by comparisons, in pairs, of the determined line to line voltages ($V_{12}$, $V_{23}$, $V_{31}$). Imbalances ($\Delta V_{12}$, $\Delta V_{23}$, $\Delta V_{31}$) in the three-phase network (42) can thus be reduced in a simple manner.

8 Claims, 4 Drawing Sheets

METHOD AND DEVICE FOR REDUCING VOLTAGE IMBALANCES IN A THREE-PHASE NETWORK BY MEANS OF A STATIC COMPENSATOR

BACKGROUND OF THE INVENTION

The present invention pertains to a method and a device for reducing voltage imbalances in a three-phase network by a static compensator.

Electrical power supply networks are primarily used for transmitting real power. Power which is produced and consumed must always be compensated for so as to prevent frequency changes from occurring. In the same way as the real power balance, the reactive power balance must also always be compensated for so that acceptable voltage conditions prevail in the network. The reactive power is primarily responsible for the voltage level. The real power and reactive power balance in the network must be compensated for at all times so that the voltage and frequency are within predetermined limits.

Power transmission networks are used more and more intensively because of increasing power consumption and limited network extension capabilities. Reactive power flows in the network are the main cause of voltage drops and additional network losses. A compensated reactive power balance in the network can be present, and the influence on the network voltage and network losses can thus be reduced by the objective use of reactive power means, such as capacitors and coils. The different dynamic requirements can be covered by switchable or controllable reactive power elements. However, continuous and dynamic change is in practice possible only through the use of converter circuits. Static compensators using thyristor technology represent the most economical solution at the moment for dynamic reactive power compensation.

The static compensator, also called a Static Var Compensator (SVC), may contain a thyristor-controlled inductor coil, thyristor-controlled capacitors (TSC: Thyristor-Switched Capacitor) and a permanently connected capacitor (FC: Fixed Capacitor). The method of operation and a comparison of two static compensators of different construction can be found in the journal "Energy & Automation X" (1989), No. 1, pages 12 to 17, under the title "A Closer Look at Thyristors in SVC Applications".

The article "BALANCING ASYMMETRIES BY MEANS OF THYRISTOR-CONTROLLED STATIC VAR COMPENSATORS" by B. Klerfors and T. Petersson, printed in Cigre Conference Proceedings, 28.08 to 03.09.1988, pages 1 to 6, proposes two different types of control for a static compensator (SVC) having a thyristor-controlled coil. One type of control is called "open-loop control" and the other "closed-loop control". Unbalanced loads, such as powerful single-phase loads or an electric furnace, lead to voltage fluctuations across the internal impedance of the supplying network, and can interfere with other loads. These unbalanced loads produce current and voltage components of an opposing voltage system, but no neutral system. The components of the opposing system in the network voltage have a negative influence on three-phase motors, as a result of which their rotors are increasingly heated (overload, shortened life). The control of a static compensator has the object of always driving the thyristors of the compensator so that the reactive current load on the network is as low as possible, is as constant as possible and, overall, the network load is as balanced as possible.

In the case of the open-loop control device, phase-related reactive power values are calculated from measured load currents and the determined line to line voltages of the network, from which reactive power values of the compensator are then calculated. These reactive power values are in each case superimposed on an adjustable reactive power value.

These sum signals are subsequently converted into triggering signals for the thyristors of the compensator. This type of control allows unbalanced load currents to be compensated for directly, that is to say the imbalances are reduced to an adjustable value.

The second control device (closed-loop control) in this article is illustrated in greater detail here and is described comprehensively, with reference to FIG. 1. In contrast to the open-loop control device, the line to line voltages are used in the case of this control device. This control method ensures that the amplitudes of the line to line voltages are of equal magnitude so that balanced conditions prevail (i.e., an equilateral triangle of the voltage space vectors).

The article "System variable evaluation with digital signal processors for SVC applications" by G. Welsh, K. Bergmann, L. Hügelschäfer, K.-F. Leowold and G. Wild, printed in the "Fifth International Conference on AC and DC Power Transmission", 1991, pages 255 to 260, ("Conference Report", the disclosure of which is hereby incorporated by reference in its entirety) describes a type of voltage control for a static compensator (SVC) comprising a permanently connected capacitor (FC), a thyristor-controlled coil (TCR) and a thyristor-controlled capacitor (TCR) which has a digital construction. This type of voltage control uses the three line to earth voltages to determine a system voltage (i.e., a mean value of the three line to line voltages) which is compared with a required system voltage. A control signal for the compensator is determined from the resulting control error. This type of digital control uses a signal processor, which is a component of a multiprocessor control system (SIMADYN D), in the determination of the system voltage.

The invention is based on an object of specifying a method and a device for reducing voltage imbalances in a three-phase network by means of a static compensator.

SUMMARY OF THE INVENTION

This object is achieved according to the invention in that a correction signal is superimposed, in each case, on a produced reactive power mean value of the static compensator. The correction signals are in each case proportional to a voltage imbalance. Any voltage imbalance is produced by comparisons in pairs, of a corresponding line to line voltage with the other line to line voltages of the three-phase network. These line to line voltages are determined from the measured line to earth voltages of the three-phase network.

The advantage of this method is that the two superimposed control methods can be adjusted optimally separately from one another and that existing installations, which have a type of voltage control described above, can easily be re-equipped with the balance control method of the present invention. By splitting the method into two method elements, it is possible to activate only the voltage control method (positive-sequence control) in the case of one compensator, as a result of which the value of the network voltage is controlled at an adjustable required value. It is also possible to activate the two superimposed control methods, as a result of which, in addition to voltage control, any imbalances which are still present can also be reduced to a predetermined range.

In the case of a device for carrying out the method according to the invention having a static compensator which is controlled by a voltage control circuit, this voltage control circuit is combined with a balance control circuit where measured line to earth voltages of the three-phase network are supplied to the input side of the balance control circuit.

The advantage of this device, in the case of which two control circuits are combined, is that there is no need to set any individual control characteristic per phase or to form a mean value. Rather, a central setting of the static control characteristic is carried out on the voltage controller. In addition, this device can be of modular construction, as a result of which it is possible to re-equip a known voltage control circuit of a static compensator with a balance control circuit.

In the case of an advantageous embodiment of the device for carrying out the method, a microcomputer is provided as the voltage control circuit and/or as the balance control circuit. The construction is considerably simplified by the use of a microcomputer or of a multiprocessor control system.

DETAILED DESCRIPTION

Figure 1:
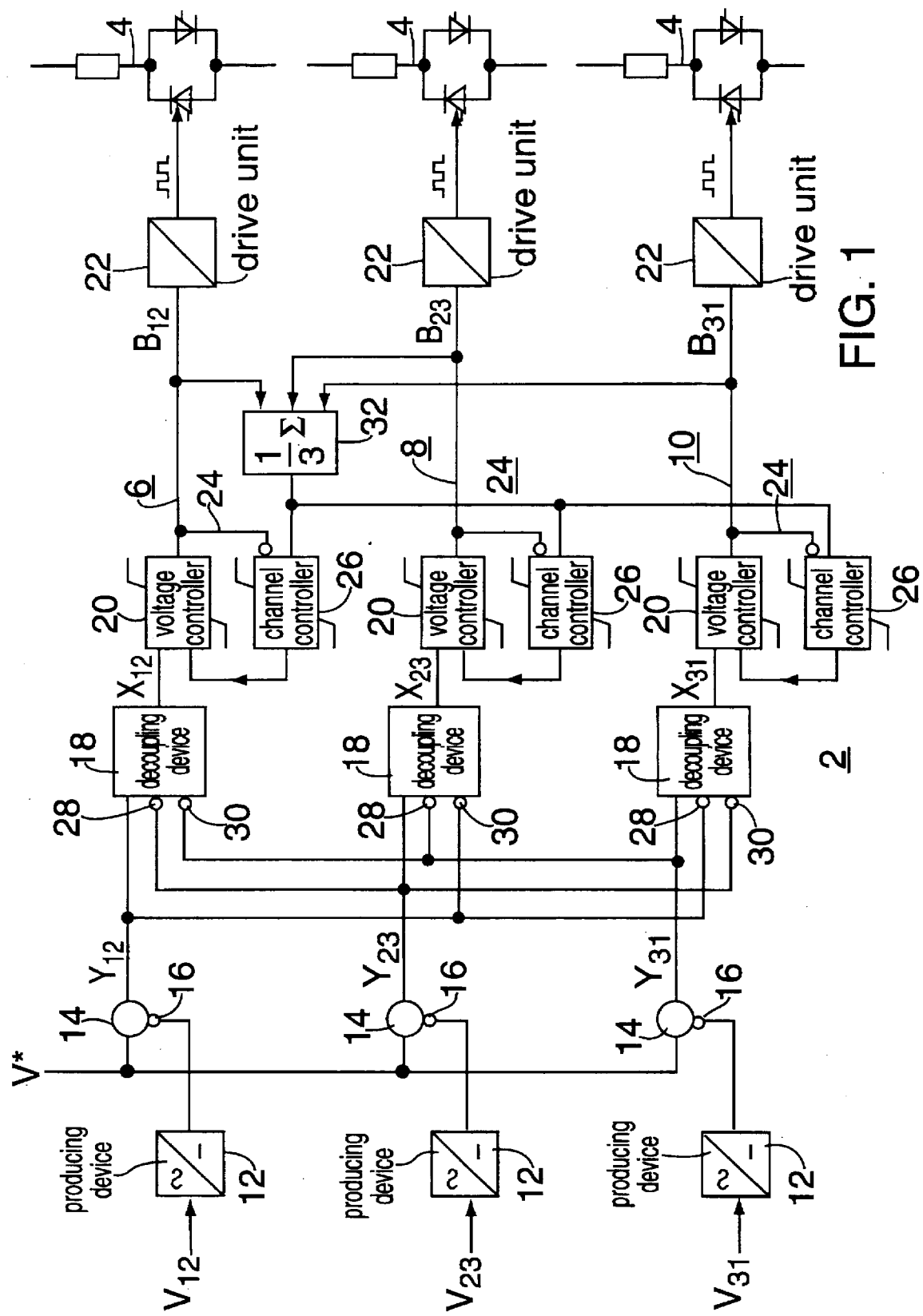
FIG. 1 shows a block diagram of the known closed-loop control device mentioned above.

FIG. 1 shows a known control device 2 for a static compensator, of which only one thyristor-controlled coil 4 per phase is illustrated in each case here. A method for reducing voltage imbalances in a three-phase network is carried out by means of this control device 2. This known control device 2 is called a "closed-loop control" in the Cigre publication mentioned above.

This control device 2 comprises three channels 6, 8 and 10, which are all of identical construction. Each channel 6 or 8 or 10 has, on its input side, a device 12 which produces an amplitude-proportional DC signal (DC signals) from the first, second, or third line to line voltage $V_{12}$ or $V_{23}$ or $V_{31}$ respectively (AC signals). This DC signal is compared with a required value V* by an adder 14 having an inverting input 16. Each determined control error $y_{12}$ or $y_{23}$ or $y_{31}$ respectively is supplied to a decoupling device 18 which is linked on its output side to a voltage controller 20, also called a phase controller. The output signal from the controller 20 determines the phase-related reactive power $B_{12}$ or $B_{23}$ or $B_{31}$ respectively of the static compensator, which is converted by a drive unit 22 into a control signal for the thyristor-controlled coil 4. A feedback path 24, which includes a controller 26, is allocated to the voltage controller 20 to achieve the static control characteristic.

Since a line to line voltage $V_{12}$, $V_{23}$ and $V_{31}$ is supplied to each channel 6, 8 and 10, these channels 6, 8 and 10 are coupled to one another. A decoupling device 18 is provided in each channel 6, 8 and 10 in order to cancel this coupling. Each decoupling device 18 has two inverting inputs 28 and 30 which are each connected to the outputs of the adders 14 of the other two channels 8 and 10 or 10 and 6 or 6 and 8 respectively. Each decoupling device 18 uses the three control errors $y_{12}$, $y_{23}$ and $y_{31}$ to determine a decoupled controller signal $x_{12}$ or $x_{23}$ or $x_{31}$ respectively. These decoupled controller signals $x_{12}$, $x_{23}$ and $x_{31}$ are determined in accordance with the following equations:

$$X_{12} = (10y_{12} - 2y_{23} - 2y_{31})/9$$

$$X_{23} = (-2Y_{12} + 10Y_{23} - 2Y_{31})/9$$

$$X_{31} = (-2Y_{12} - 2Y_{23} + 10Y_{31})/9.$$

The controller 26 of the channel 6 or 8 or 10 respectively is set so that the output signal $B_{12}$ or $B_{23}$ or $B_{31}$ respectively of the voltage controller 20 is fed back to its input until the voltage imbalance in the three-phase network is maintained in a range which can be set. If the imbalances are greater than the predetermined range, then the controller 26 has reached its limit and the feedback is held at this value. In addition, a mean value of the three reactive power signals $B_{12}$, $B_{23}$ and $B_{31}$ of the static compensator is supplied to the controller 26. This mean value is formed by the device 32 which is linked, on its input side, in each case to the outputs of the voltage controllers 20 of the channels 6, 8 and 10.

This known control device 2 makes it possible to keep voltage imbalances in the three-phase network within a predetermined range. This multichannel embodiment is very costly, because of the decoupling of the channels 6, 8 and 10.

Figure 2:
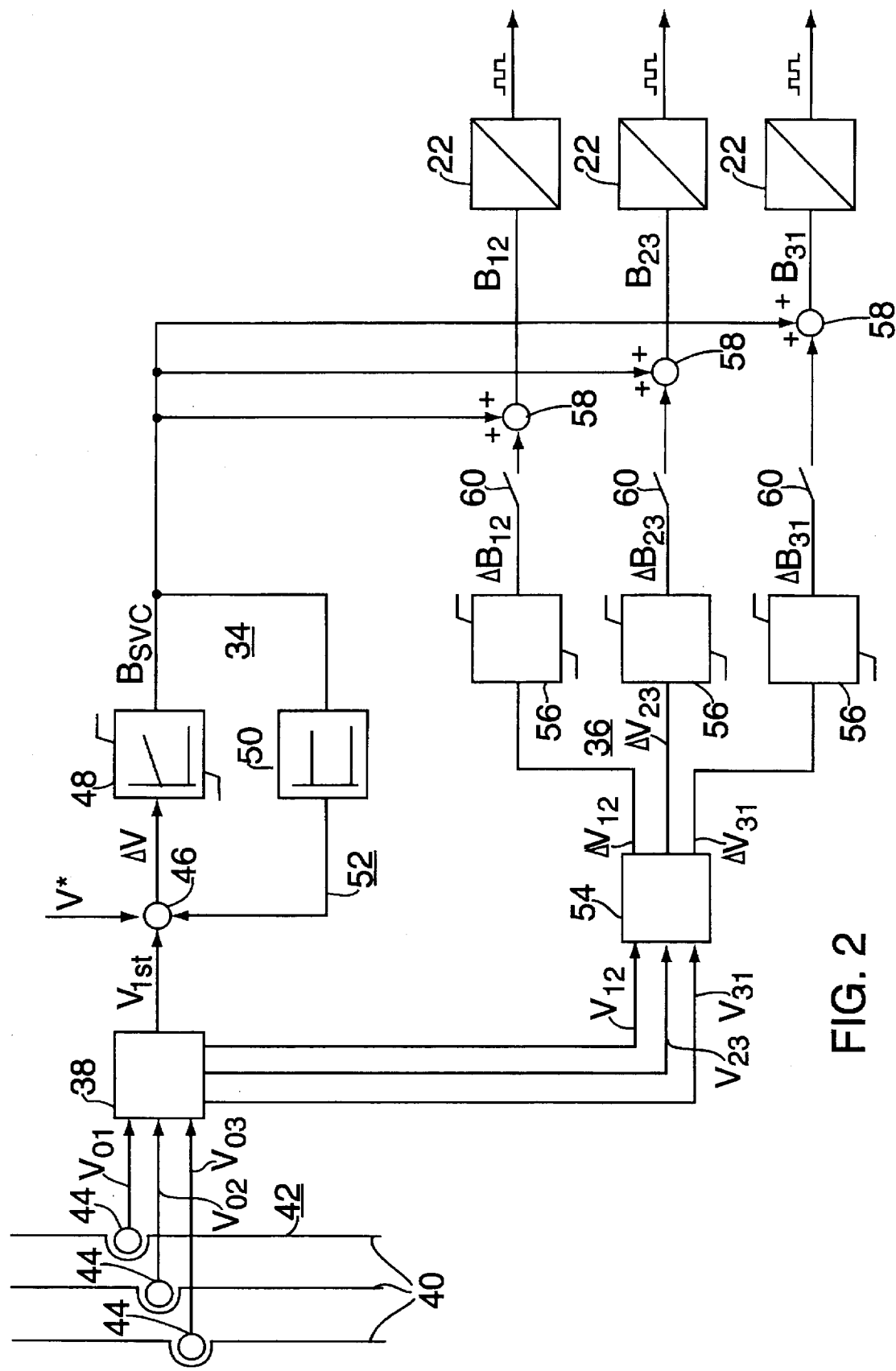
FIG. 2 shows a block diagram of a device for carrying out the method according to the invention.
Figure 3:
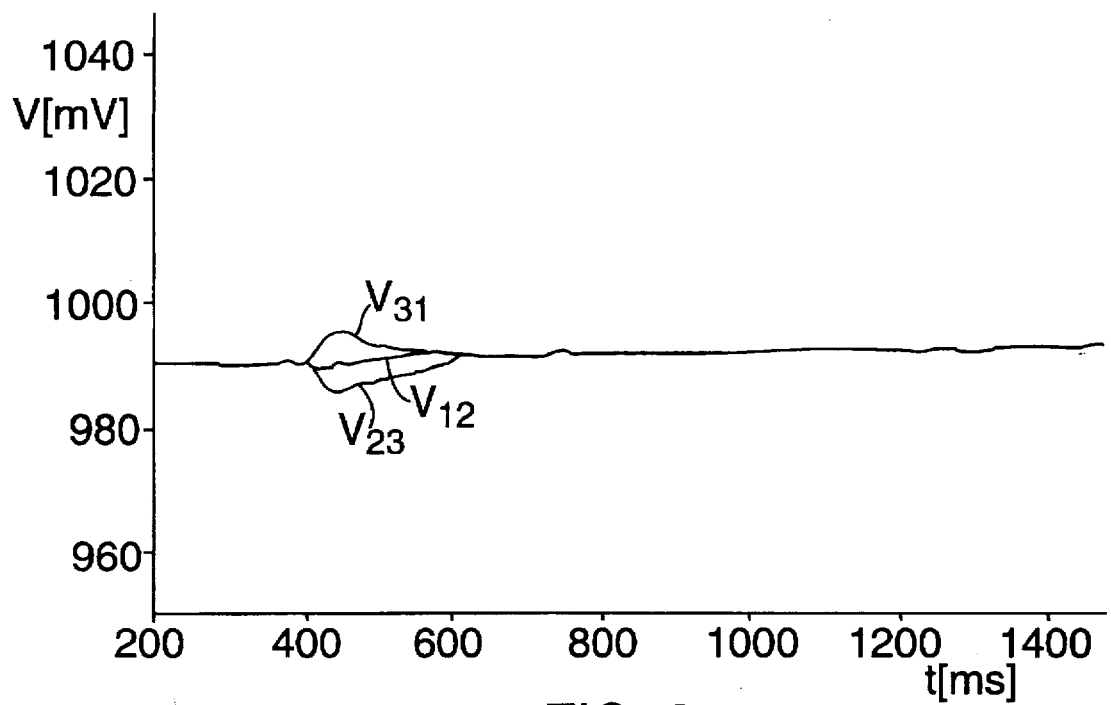
FIGS. 3 to 6 show signals of the circuit according to FIG. 2, in each case in a diagram over the value t (time).
Figure 4:
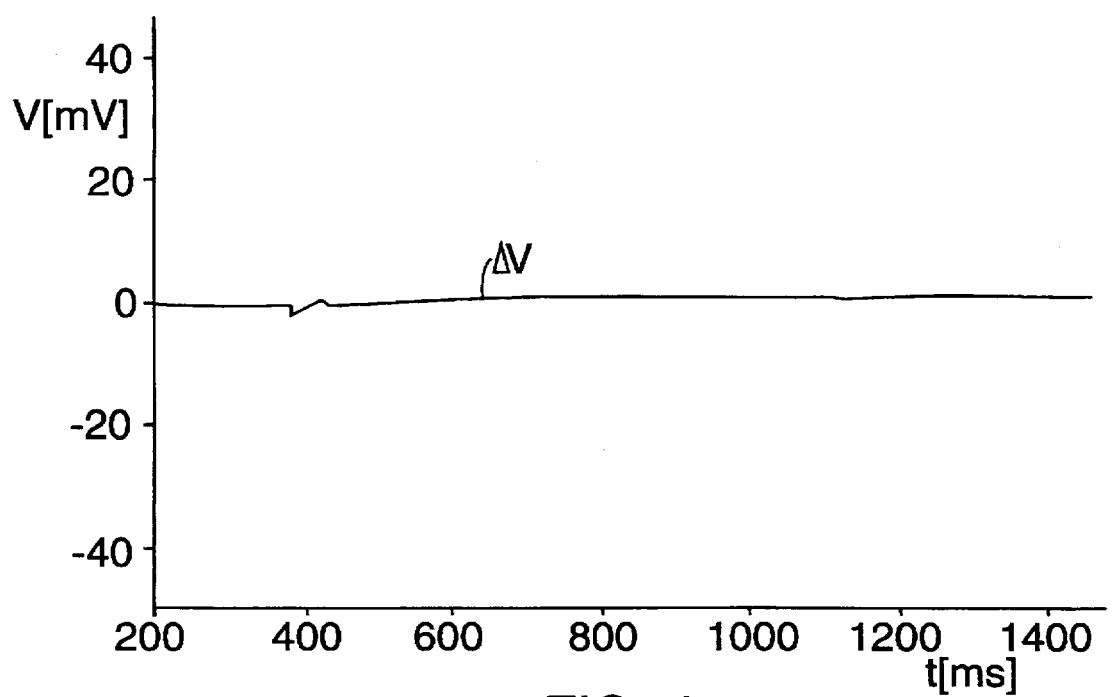
Figure 5:
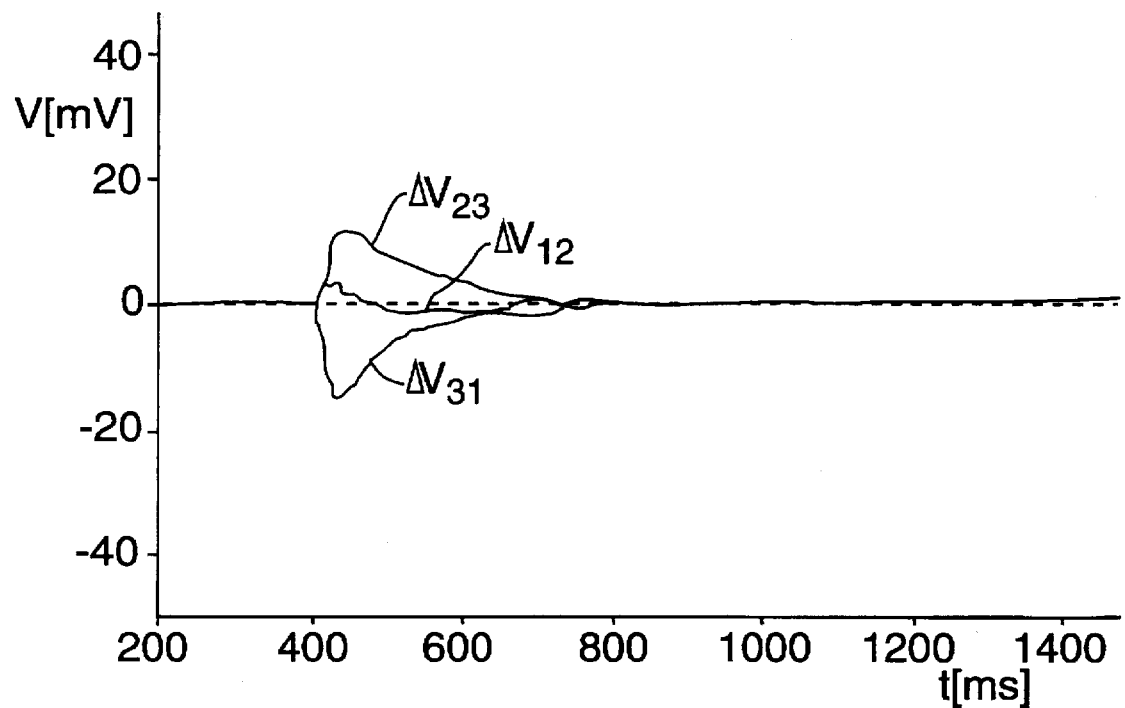
Figure 6:
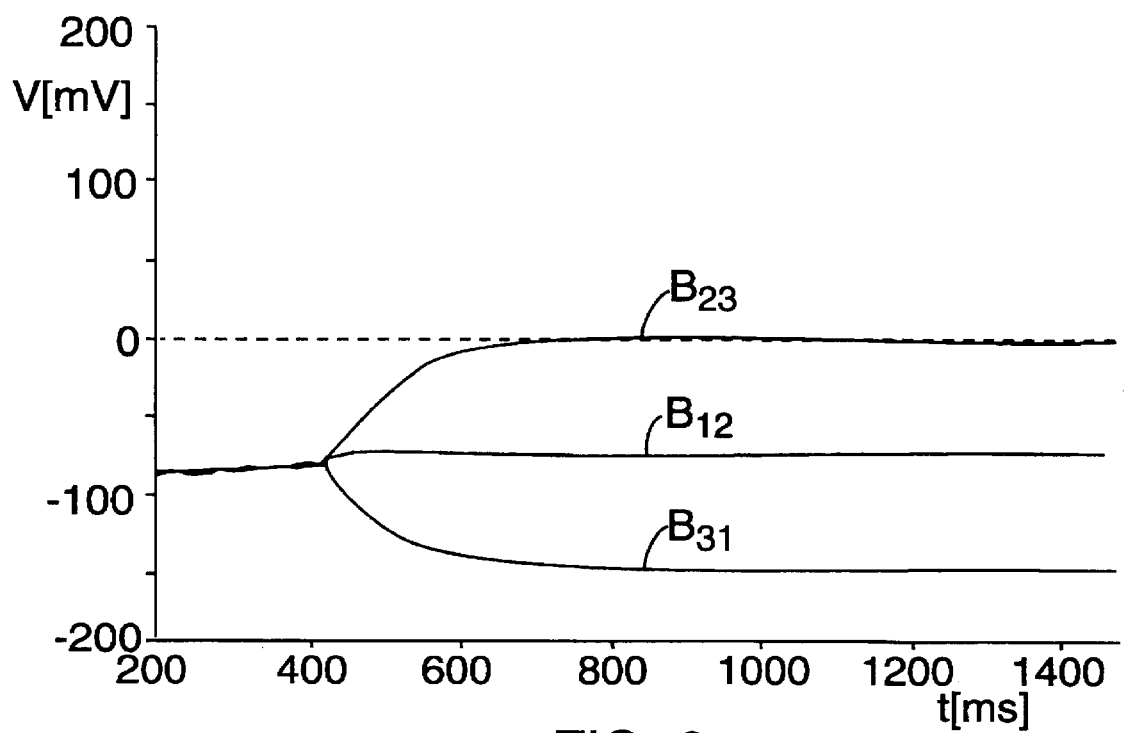

FIG. 2 illustrates a block diagram of a preferred device for carrying out the method according to the invention. The individual signals—line-to-line voltages $V_{12}$, $V_{23}$, $V_{31}$ (FIG. 3), control difference $\Delta V$ (FIG. 4) of the system voltage V, imbalance $\Delta V_{12}$, $\Delta V_{23}$, $\Delta V_{31}$ (FIG. 5), phase-related reactive power $B_{12}$, $B_{23}$, $B_{31}$ (FIG. 6)—of this device are illustrated in FIGS. 3 to 6, in each case in a diagram over time t. This device comprises a voltage control circuit 34 and a balance control circuit 36. The balance control circuit 36 is combined with the voltage control circuit 34. In the case of this preferred embodiment of the device, a unit 38 forms the actual value conditioning of the voltage control circuit 34 and of the balance control circuit 36. This actual value conditioning unit 38 produces line-to-line voltages $V_{12}$, $V_{23}$ and $V_{31}$ of the three-phase network 42, from the line-to-earth voltages $V_{O1}$, $V_{O2}$ and $V_{O3}$ which are in each case measured by a voltage converter 44 arranged in a line 40 of the three-phase network 42. The actual value conditioning unit 38 also produces a mean value $V_{ist}$ of these line-to-line voltages $V_{12}$, $V_{23}$ and $V_{31}$, which is also called the actual value $V_{ist}$ of the system voltage V.

During the conditioning of the measured line-to-earth voltages $V_{O1}$, $V_{O2}$ and $V_{O3}$ (AC signals), these voltages are transformed into line-to-line voltages and are subsequently rectified and filtered to obtain amplitude-proportional DC signals of the linked voltages $V_{12}$, $V_{23}$ and $V_{31}$. In addition, the mean value $V_{ist}$ is formed from these linked voltages $V_{12}$, $V_{23}$ and $V_{31}$. Details on the actual value conditioning 38 can be found in the Conference Report mentioned above.

On the input side, the voltage control circuit 34 comprises a comparator 46 having three inputs, downstream of which a voltage controller 48 is connected. The output of the voltage controller 48 is linked, via a controller 50 in a feedback path 52, to an inverting input of the comparator 46. In addition, the output is in each case electrically conductively connected to one of the three drive units 22 of the thyristor-controlled coils 4. The actual value $V_{ist}$ of the system voltage V is present at a second inverting input of the comparator 46, a required value V* of the system voltage V is present at the non-inverting input of the comparator 46. The determined control difference $\Delta V$—illustrated with respect to time in the diagram in FIG. 4—is supplied to the voltage controller 48 which uses it to produce a mean susceptance value $B_{SVC}$ of the static compensator. A deviation from the value zero, but which is very small in comparison with the illustration according to FIG. 5, can be taken from the response of the control difference ΔV of the system voltage V according to the diagram in FIG. 4, at the time of the imbalances $\Delta V_{12}$, $\Delta V_{23}$ and $\Delta V_{31}$. The voltage controller 48, which is also called a positive-sequence controller, determines the mean drive level of the compensator and is identical for all three thyristor-controlled coils 4. The static control characteristic is achieved by feeding back the output of the voltage controller 48. This voltage controller 48 has a fast reaction time (approximately 20 ms) and controls the positive-sequence system of the network voltage.

In order to balance the network voltage, this mean drive level $B_{SVC}$ individually has a correction signal $\Delta B_{12}$, $\Delta B_{23}$ and $\Delta B_{31}$ superimposed on it for each phase. For this purpose, the balance control circuit 36 has, on its input side, a device 54 which compares the amplitude-proportional DC signals of the three linked voltages $V_{12}$, $V_{23}$ and $V_{31}$—illustrated with respect to time in the diagram in FIG. 3—with one another in pairs in order to determine the imbalances $\Delta V_{12}$, $\Delta V_{23}$ and $\Delta V_{31}$, which are illustrated with respect to time in a diagram in FIG. 5. This comparison in pairs in order to determine the imbalances $\Delta V_{12}$, $\Delta V_{23}$ and $\Delta V_{31}$ is described in more detail by the following equations:

$$\Delta V_{12} = \tfrac{1}{3}(-2V_{12}+V_{23}+V_{31})$$

$$\Delta V_{23} = \tfrac{1}{3}(V_{12}-2V_{23}+V_{31})$$

$$\Delta V_{31} = \tfrac{1}{3}(V_{12}+V_{23}-2V_{31}).$$

These imbalances $\Delta V_{12}$, $\Delta V_{23}$ and $\Delta V_{31}$ are each supplied to a controller 56 at whose outputs the correction signals $\Delta B_{12}$, $\Delta B_{23}$ and $\Delta B_{31}$ are present. In a particular embodiment, only imbalances greater than a predetermined magnitude are processed further. In order to detect these minimum imbalances, a device, such as a threshold value detector can be provided, or this device can be a component of the respective controller 56. This limit can be predetermined as desired. The correction signals $\Delta B_{12}$, $\Delta B_{23}$ and $\Delta B_{31}$ are in each case added to the mean drive value $B_{SVC}$ of the static compensator, by an adder 58. After this addition, the phase-related susceptance signals $B_{12}$, $B_{23}$ and $B_{31}$ are available to the drive units 22 which each generate phase-related drive signals for the thyristor-controlled coils 4. In contrast to the voltage controller 48, the correction controllers 56 each have a slower reaction time (approximately 200 ms), in order to avoid interactions with the positive-sequence controller 48.

In the case of this preferred embodiment, a switch 60, which can be controlled from a control panel, is in each case arranged between the correction controller 46 and the adder 58. The balance control circuit 36 can be disconnected temporarily or permanently by means of this switch 60. As a result of this separation, the two control circuits 34 and 36 can each be of modular construction. In addition, it is possible to integrate the balance control circuit 36 subsequently into a controller of a compensation installation which has a positive-sequence controller 48 (mentioned above in the Conference Report).

I claim:

1. A method for reducing voltage imbalances in a three-phase network by a static compensator, comprising:

superimposing individual correction signals on a mean susceptance value of the static compensator to produce phase-related susceptance values;

determining line-to-line voltages from measured line-to-earth voltages of the three-phase network; and producing, in individual comparison circuits, voltage imbalance values, wherein each of the individual correction signals is proportional to a corresponding one of the voltage imbalance values, each of the voltage imbalance values being generated by comparing a corresponding one of the line-to-line voltages with different ones of the line-to-line voltages of the three-phase network.

2. The method of claim 1, further comprising:

forming an actual value of a system voltage for the three-phase network from the measured line-to-earth voltages of the three-phase network, the actual value controlled in dependence on a predetermined required voltage; and producing the mean susceptance value using a voltage control circuit as a function of the predetermined required voltage value and the actual value of the system voltage, the actual value being formed from the measured line-to-earth voltages of the three-phase network.

3. A device for reducing voltage imbalances in a three-phase network, comprising:

a static compensator;

a voltage control circuit generating a susceptance mean value and controlling the static compensator, the voltage control circuit including individual comparison circuits producing voltage imbalance values;

a balance control circuit generating correction signals and controlling the static compensator, each of the correction signals being proportional to a corresponding one of the voltage imbalance values; and a conditioning circuit having a conditioning input side and a plurality of conditioning output sides, the conditioning input side being coupled to a plurality of voltage converters for receiving line-to-earth voltages, the voltage control circuit coupled to one of the plurality of conditioning output sides for receiving line-to-line voltages, the balance control circuit coupled to another one of the plurality of conditioning output sides, wherein each of the voltage imbalance values is generated by comparing a corresponding one of the line-to-line voltages with different ones of the line-to-line voltages of the three-phase network, the line-to-line voltages being determined from the measured line-to-earth voltages of the three-phase network, and wherein each of the correction signals are superimposed on the mean susceptance value of the static compensator to generate phase-related susceptance values.

4. The device of claim 3, wherein the balance control circuit includes:

a plurality of conditioning controllers arranged in lines of the three-phase network;

a comparing apparatus having an input comparing side and an output comparing side, the comparing apparatus coupled to the plurality of conditioning converters on the input comparing side via the conditioning circuit, the comparing apparatus coupled to at least one of the plurality of conditioning converters at the output comparing side.

5. The device according to claim 4, wherein the voltage control circuit includes a voltage control input for an actual value conditioning, and wherein the balance control circuit includes a balance control input for the actual value conditioning, the voltage and balance control inputs forming the conditioning circuit.

6. The device according to claim 4, wherein the voltage control circuit includes a plurality of adders positioned at a voltage control output of the voltage control circuit, the balance control circuit including a balance control output, and further comprising:

a switch coupled between a corresponding one of the plurality of switches and the balance control output, each of the switches being capable of disconnecting the balance control circuit from the corresponding one of the plurality of adders.

7. The device according to claim 3, further comprising:

a plurality of conditioning controllers arranged in lines of the three-phase network, wherein the voltage control circuit includes a plurality of adders and is coupled to the plurality of conditioning converters via the conditioning circuit.

8. The device according to claim 3, wherein at least one of the voltage control circuit and the balance control circuit is a microcomputer.

* * * * *